June 30, 1931.  H. FLACH ET AL  1,812,329
CIRCUIT MAKER OR BREAKER
Filed Aug. 20, 1928
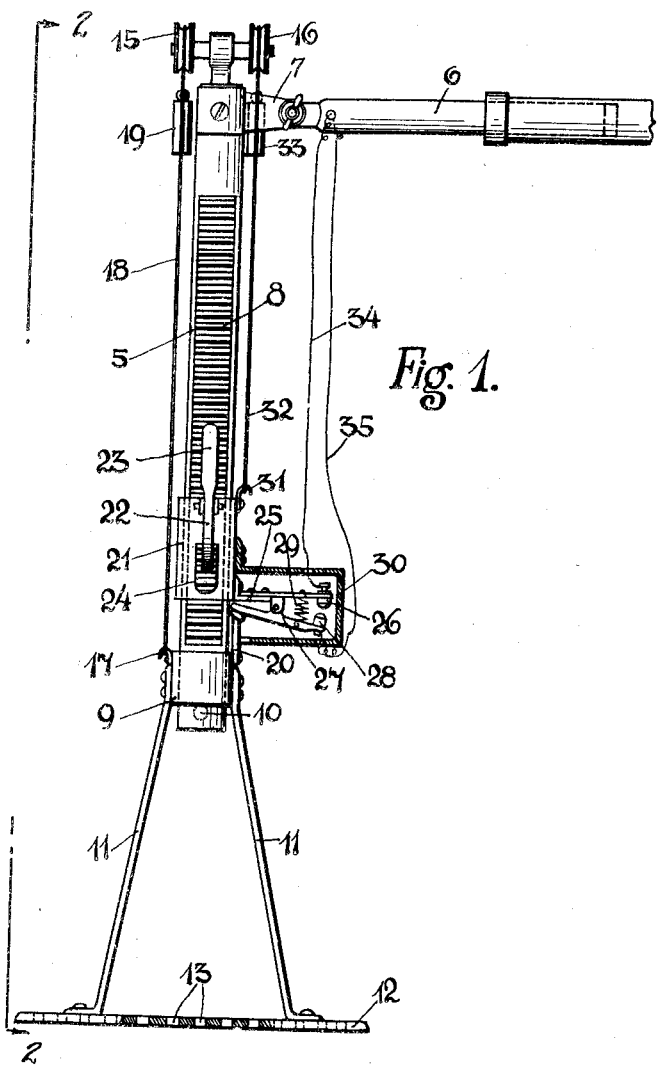
Fig. 1.
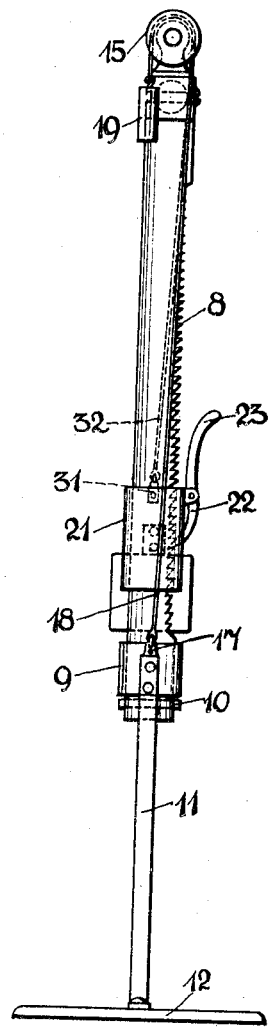
Fig. 2.
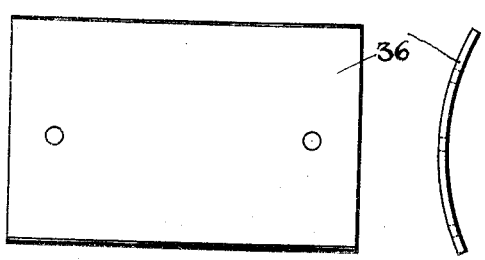
Fig. 3.
Fig. 4.
Hermann Flach
George Barthelmie
INVENTORS.
BY Erich H. Michaelis
ATTORNEY.

Patented June 30, 1931

1,812,329

UNITED STATES PATENT OFFICE

HERMANN FLACH AND GEORGE BARTHELMIE, OF CALUMET CITY, ILLINOIS

CIRCUIT MAKER OR BREAKER

Application filed August 20, 1928. Serial No. 300,702.

The invention relates to circuit maker or breaker and more especially to such apparatus to be used to control the fermentation of a yeast dough and the like, and to give a signal, when the fermentation is finished and the reaction sets in, or as commonly expressed, when the dough begins to fall.

The object of the invention is to provide an apparatus having a plate and an electric contact, the former being adapted to rest on the dough to be watched, to be lifted by said dough, when the latter ferments, and to drop when the reaction sets in and the dough falls, thereby closing said contact, which is normally held open.

Other objects of the invention not specifically mentioned may be easily ascertained and understood from the following description in connection with the accompanying drawings forming a part thereof. It is however to be noted, that the invention is not to be limited or restricted to the exact construction and formation shown in the drawings and described in the specification, but that said invention is only to be limited by the scope of the claims appended hereto.

The drawings illustrate some preferred embodiments of the invention and in said drawings Fig. 1 is an elevation of an apparatus according to the present invention.

Fig. 2 is a view of said apparatus taken on line 2—2 of Fig. 1 in the direction of the arrows.

Fig. 3 is a top view of a control plate of a modified form as compared with the control plate used in Figs. 1 and 2.

Fig. 4 is an end view of the plate illustrated in Fig. 3.

A guide post 5, which may be of any desired cross section, is attached to a supporting arm 6. This arm in turn may be fastened to a wall or may be carried by a movable frame (not shown). As indicated in the drawings the arm 6 may be constructed in such a manner, that it is axially adjustable. It is however to be understood, that the construction of the supporting means does not form a part of the invention, and for this reason said means are neither shown in detail in the drawings nor are especially described in this specification. The connection between the post 5 and the arm 6 may be made in any desired manner, but preferably an adjustable swivel connection 7 is employed. On side of the post 5 is provided with ratchet teeth 8. This toothed portion extends over the major part of the post leaving a smooth portion adjacent the bottom end of said post. A sleeve 9 fits slidingly onto said smooth portion and is adapted to glide over the entire length of said member if it is so desired. In order to prevent said sleeve from sliding entirely off said post a pin 10 or the like is driven through said post and extends beyond the same.

Two bars 11 are fastened to the sleeve and extend downwardly and outwardly therefrom. A plate 12 is attached to the lower ends of said bars. Since it is necessary to make all the members movably connected to the post as light as possible, the plate 12 may be provided with a plurality of openings 13.

On the upper end of the post a horizontal shaft 14 is arranged and adjacent each end of said shaft a pulley 15 and 16 respectively is mounted.

On one side of the sleeve 9 adjacent the upper rim thereof a hook 17 or the like is provided and a cord or small cable 18 or the like is fastened to said hook and trained over one of said pulleys 15. From the free end of said cable a counterweight 19 is suspended.

Diametrically opposite the hook 17 a finger 20 is fastened to the sleeve 9 and extends upwardly therefrom. A second sleeve 21 is also slidably mounted on the post and is arranged above the first mentioned sleeve 9. On the second sleeve adjacent the upper rim thereof a ratchet lever 22 is pivotally mounted having a handle portion 23. The ratchet lever extends through a hole 24 provided in the second sleeve and engages the ratchet teeth 8 of the post. The ratchet lever and the handle thereof is formed in such a manner, that the lever is forced into engagement with said teeth by the weight of the handle. The teeth are shaped so, that the second sleeve may slide upwardly on the post, but will be prevented from downward movement until the lever is disengaged from said teeth being pivoted by the handle being forced inwardly toward the post.

On the second sleeve at right angles to the opening in said sleeve a bracket 25 is fastened carrying a relatively stationary contact point 26. A switch lever 27 carrying a second contact point 28 is pivotally mounted on said bracket in such a manner, that the two points are adapted to contact with each other. An extensible spring 29 urges the second contact point toward the first point. A casing 30 fastened to the second sleeve surrounds the switch mechanism described above, and the finger 20 of the first sleeve is adapted to reach into said casing to engage the switch lever, when the apparatus is in normal position, and to force the second contact point away from the first one.

Adjacent the upper rim of the second sleeve a second hook 31 or the like is fastened, and a second cable 32 or the like is attached to said hook and trained over the second pulley 16 carrying a second counterweight 33 on its free end.

From the two contact points electric conductors 34 and 35 respectively are leading to the poles of a source of electricity (not shown) and an electric signaling device of any desired and suitable type (not shown) may be interposed in the circuit formed by said conductors.

In Figs. 3 and 4 a contact plate 36 is illustrated, which may be used instead of the plate 12, the only difference between said two plates being, that the one plate is straight, while the other one is curved. It may be mentioned here, that said plate may also have a spherical curvature.

The apparatus is used as follows:

When the dough is mixed and is ready for fermentation, the plate 12 or 36, as the case may be, is brought into light contact with the surface of the dough, the second sleeve is brought into normal position, so that the finger engages the switch lever keeping the contact points separated.

When the dough ferments it rises and will carry the plate upwardly. Together with the plate the two sleeves and the parts mounted thereon will move upwardly, the counterweights 19 and 33 facilitating such movement. During this movement the ratchet lever will glide over the ratchet teeth. When the fermentation is over and the reaction sets in, the dough begins to fall. The first sleeve being free to slide downwardly on the post, will follow the downward movement of the dough, while the upper sleeve will be held in its elevated position by the ratchet lever being in engagement with the ratchet teeth. Through the movement of the lower sleeve downward in relation to the upper sleeve, the finger will be disengaged from the switch lever permitting the spring to contract and to close the switch, thereby also closing the electric circuit and energizing whatever signal is interposed therein.

Having described our invention and how the same is to be performed, we claim as new and desire to secure by Letters Patent:

1. In a device of the class described a post, ratchet teeth on said post, a sleeve slidably mounted on said post, said sleeve having a hole therein, a ratchet lever pivotally mounted on said sleeve and adapted to engage said ratchet teeth through said hole, said teeth being formed to prevent downward movement of said sleeve when engaged by said lever, a second sleeve, slidably mounted on said post and below the first sleeve, an electric switch on said first sleeve, means for urging said switch into closed position, and means on said second sleeve for engaging said switch and forcing it into open position.

2. In a device of the class described, a post, a sleeve slidably mounted thereon, means for preventing accidental downward movement of said sleeve relative to said post, a second sleeve slidably mounted on said post and below the first sleeve, a relatively stationary contact point on said first sleeve, a switch lever pivotally mounted on said first sleeve, a second contact point on said switch lever, means for urging said switch lever into contact closing position, and means on said second sleeve adapted to engage said switch lever for forcing it into contact opening position.

In witness whereof we affix our signatures.

HERMANN FLACH.
GEORGE BARTHELMIE.